(12) United States Patent
Joo et al.

(10) Patent No.: US 7,273,140 B2
(45) Date of Patent: Sep. 25, 2007

(54) TORQUE CONVERTER FOR VEHICLE

(75) Inventors: In Sik Joo, Daegu (KR); Jae Duk Jang, Daegu (KR); Jae Yong Lee, Daegu (KR); Sang Min Yang, Daegu (KR); Myung Sik Kim, Daegu (KR); Jong Min Lim, Busan (KR)

(73) Assignee: Korea Powertrain Co., Ltd, Daegu (KR)

(*) Notice: Subject to any disclaimer, the term of this patent is extended or adjusted under 35 U.S.C. 154(b) by 158 days.

(21) Appl. No.: 11/056,225

(22) Filed: Feb. 14, 2005

(65) Prior Publication Data

US 2006/0065502 A1    Mar. 30, 2006

(30) Foreign Application Priority Data

| Sep. 24, 2004 | (KR) | 10-2004-0077329 |
| Sep. 24, 2004 | (KR) | 10-2004-0077330 |
| Sep. 24, 2004 | (KR) | 10-2004-0077331 |
| Oct. 11, 2004 | (KR) | 10-2004-0080945 |

(51) Int. Cl.
*F16H 45/02* (2006.01)

(52) U.S. Cl. ............................. 192/3.29; 192/113.32

(58) Field of Classification Search ........... 60/345, 60/366, 367; 29/889.5
See application file for complete search history.

(56) References Cited

U.S. PATENT DOCUMENTS

| 2,890,661 | A | * | 6/1959 | Egbert .................... 416/180 |
| 4,133,091 | A | * | 1/1979 | Ito .......................... 29/33 K |
| 5,109,604 | A | * | 5/1992 | Koebele ................... 29/889.5 |
| 5,605,210 | A | * | 2/1997 | Koike et al. ............... 192/3.29 |
| 5,676,230 | A | * | 10/1997 | Awaji et al. .............. 192/110 B |
| 5,881,556 | A | * | 3/1999 | Matsuoka ................... 60/339 |
| 5,946,962 | A | * | 9/1999 | Fukuda et al. ................ 72/335 |
| 6,000,510 | A | * | 12/1999 | Kirkwood et al. ......... 192/3.29 |
| 6,464,054 | B2 |  | 10/2002 | Fukunaga et al. |
| 6,575,276 | B2 |  | 6/2003 | Fukunaga et al. |
| 6,615,582 | B2 | * | 9/2003 | Yamamoto et al. ........... 60/345 |
| 2002/0180288 | A1 | * | 12/2002 | Muramatsu et al. ......... 310/90 |

FOREIGN PATENT DOCUMENTS

| JP | 52019864 A | * | 2/1977 |
| JP | 10-009364 |  | 1/1998 |
| JP | 2001027303 A | * | 1/2001 |
| JP | 2001-116110 |  | 4/2001 |
| JP | 2004-156724 |  | 6/2004 |

\* cited by examiner

*Primary Examiner*—Richard M Lorence
(74) *Attorney, Agent, or Firm*—Pearl Cohen Zedek Latzer LLP

(57) ABSTRACT

A torque converter for a vehicle includes a front cover integrally formed with a boss to which a crank shaft of an engine side is connected, an impeller connected to the front cover to rotate together with the front cover, a turbine disposed facing the impeller, a stator disposed between the impeller and the turbine to convert flow of oil directed from the turbine, a lockup clutch mechanism for directly connecting the engine to the turbine. A blade of the impeller and/or the turbine is provided with inner and outer projections coupled to shell and core of the impeller and/or the turbine. Each of the inner and outer and inner projections includes a base located on a slit formed on the shell/core and an extending section extending from the base, the extending section being bent after penetrating the slit.

3 Claims, 5 Drawing Sheets

TORQUE CONVERTER FOR VEHICLE

CROSS-REFERENCE TO RELATED APPLICATIONS

This application claims priority from Korean Patent Application No. 10-2004-0080945, filed Oct. 11, 2004, Korean Patent Application No. 10-2004-0077329, filed Sep. 24, 2004, Korean Patent Application No. 10-2004-0077330, filed Sep. 24, 2004, and Korean Patent Application No. 10-2004-0077331, filed Sep. 24, 2004, which are hereby incorporated by reference.

BACKGROUND OF THE INVENTION

1. Field of the Invention

The present invention relates to a torque converter for a vehicle, and more particularly, to a torque converter for a vehicle, which is improved in an assembling property and structural rigidity and which is designed to restrict movement of a one-way clutch in a direction of a shaft axis and prevent a retainer from being worn.

2. Description of the Related Art

Generally, since a torque converter is designed to transmit power using fluid, it can control the speed acceleration and reduction.

Such a torque converter includes an impeller rotating together with a torque shaft as a single body, a turbine rotating by oil pumped out from the impeller, and a stator improving the torque converting efficiency by directing the oil being returned to the impeller in a rotational direction of the impeller.

Describing in more detail, the stator is designed to direct the oil, which is used to rotate the turbine, toward backsides of blades of the impeller, thereby boosting the rotation of the impeller. Accordingly, a shape of each blade of the stator affects the torque converting efficiency.

When load applied to an engine is increased, the power transmission rate may be deteriorated. In order to prevent this, the torque converter includes a unit for directly connecting the engine to the transmission.

Such a unit is called a lockup clutch that is disposed between a front cover directly connected to the engine and the turbine so that rotation power of the engine can be directly transmitted to the turbine.

As the performance of the engine is improved, the performance of the torque converter should be improved. Generally, the each of the impeller and turbine of the torque converter is comprised of a shell, a core located in the shell, and a plurality of blades disposed between the shell and the core to induce the flow of the oil.

Each of the blades is designed to be relatively thin and coupled to the shell and core through a brazing process.

When the engine is driven, the impeller rotates to direct the oil toward the turbine, thereby rotating the turbine. By the rotation of the turbine, the oil is returned toward the impeller.

At this point, since the flow speed of the oil is very high, the oil pressure acting on the blades is also very high.

Although the blades designed enough to endure the high pressure, it is further required to increase the structural rigidity of the blades as the performance of the engine is enhanced.

However, when the thickness of the blades is increased, a volume of the actuating chamber is reduced by as much as the volume occupied by the increased thickness, thereby deteriorating the converting efficiency.

Furthermore, when the blades increased in the thickness are coupled to the shell and core through the brazing process, the blades may be subject to thermal deformation.

Meanwhile, the stator is disposed between the impeller and the turbine to increase the torque converting rate by converting the flow of the oil.

When an RPM of the impeller is higher than that of the turbine, the stator does not rotate. However, when the RPM of the impeller becomes almost identical to that of the turbine, the oil acts on the backsides of the blades to rotate the stator. At this point, the torque converter functions as a fluid clutch.

By the above-described operation, the stator functions to increase the torque converting rate. At this point, in order to achieve the above-described operation, the stator should be designed to rotate only in a direction.

For the one-way rotation, the stator is installed on an outer race of a one-way clutch having an inner race fixed on a stationary member.

In addition, there is provided a retainer abutting to a sidewall of the one-way clutch to prevent the one-way clutch from moving in a direction of the shaft axis.

That is, the retainer functions to prevent the one-way clutch from moving in the axial direction and to support a side of a needle bearing located between the turbine hub and the one-way clutch.

However, since the retainer is disposed to simply frictional-contacting the needle bearing, when the retainer is worn or moved by force applied in the axial direction, the endurance of the torque converter is deteriorated, reducing the service life thereof.

SUMMARY OF THE INVENTION

Therefore, the present invention has been made in an effort to solve the above-described problems.

It is an objective of the present invention to provide a torque converter for a vehicle, which is designed to enhance the torque converting efficiency and to be effectively applied to a high performance engine.

To achieve the above objective, the present invention provides a torque converter for a vehicle, comprising a front cover integrally formed with a boss to which a crank shaft of an engine side is connected; an impeller connected to the front cover to rotate together with the front cover; a turbine disposed facing the impeller; a stator disposed between the impeller and the turbine to convert flow of oil directed from the turbine; a lockup clutch mechanism for directly connecting the engine to the turbine, wherein a blade of the impeller and/or the turbine is provided with inner and outer projections coupled to shell and core of the impeller and/or the turbine; and each of the inner and outer and inner projections includes a base located on a slit formed on the shell/core and an extending section extending from the base, the extending section being bent after penetrating the slit.

The slit through which the projection is inserted may be caulked to prevent the projection from moving.

The adjacent extending sections may be bent in an opposite direction to each other.

The stator may be coupled on an outer circumference of the one-way clutch, further comprising a retainer coupled to the one-way clutch to prevent movement of the one-way clutch, the retainer being provided with a groove on which a race of a needle bearing supporting axial load of the impeller and the turbine is located.

The retainer may be provided with a hole through which oil is supplied to the one-way clutch, the hole is formed on an oil supplying groove.

The oil supplying groove may be formed in an arc shape, a width of the oil supplying groove is gradually reduced as it goes from a center portion to an outer portion.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2b is a partial enlarged view of FIG. 2a; and

DETAILED DESCRIPTION OF THE INVENTION

Reference will now be made in detail to the preferred embodiments of the present invention, examples of which are illustrated in the accompanying drawings Wherever possible, the same reference numbers will be used throughout the drawings to refer to the same or like parts.

Figure 1:
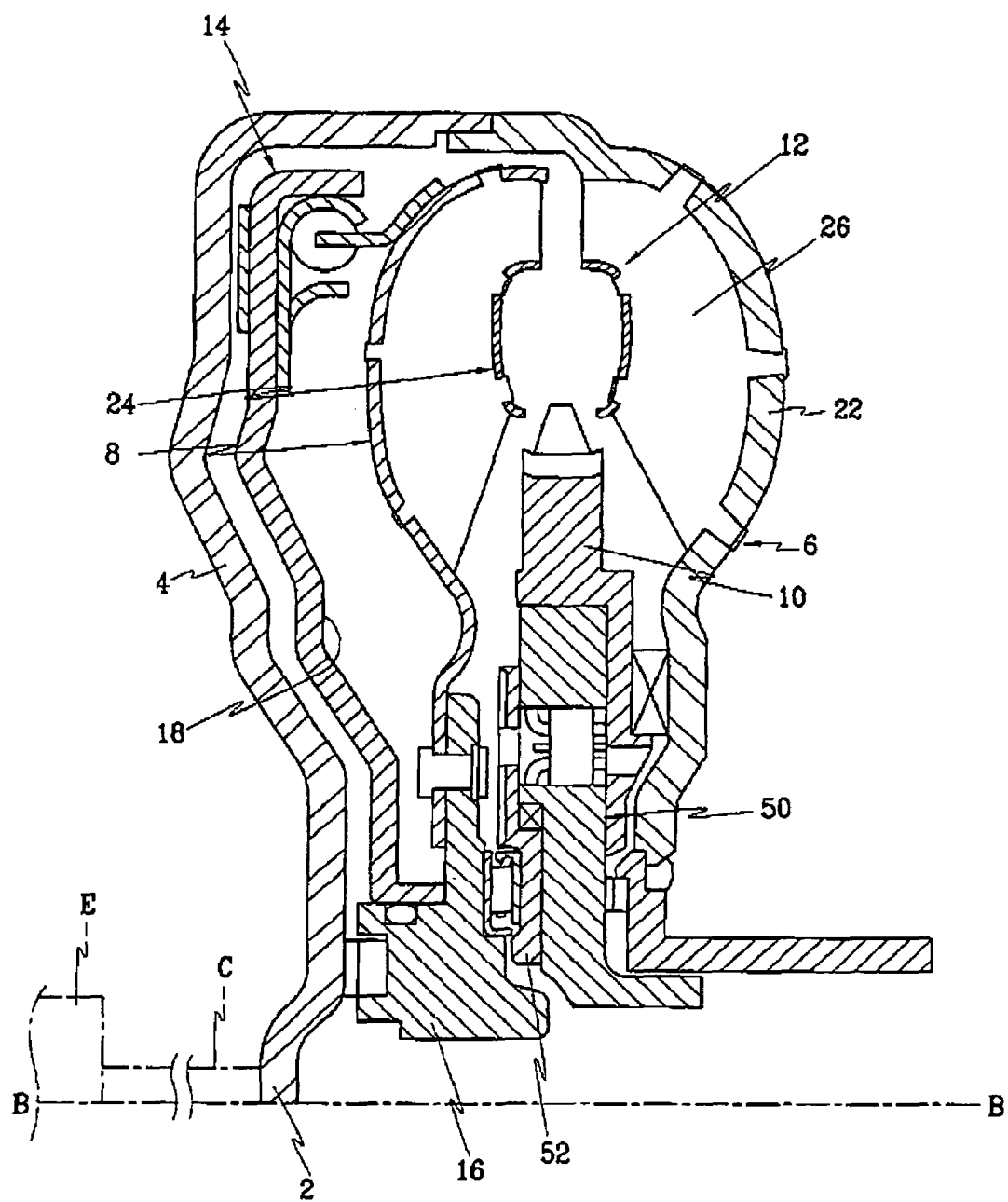
FIG. 1 is a half-sectional view of a torque converter according to an embodiment of the present invention.
Figure 2A:
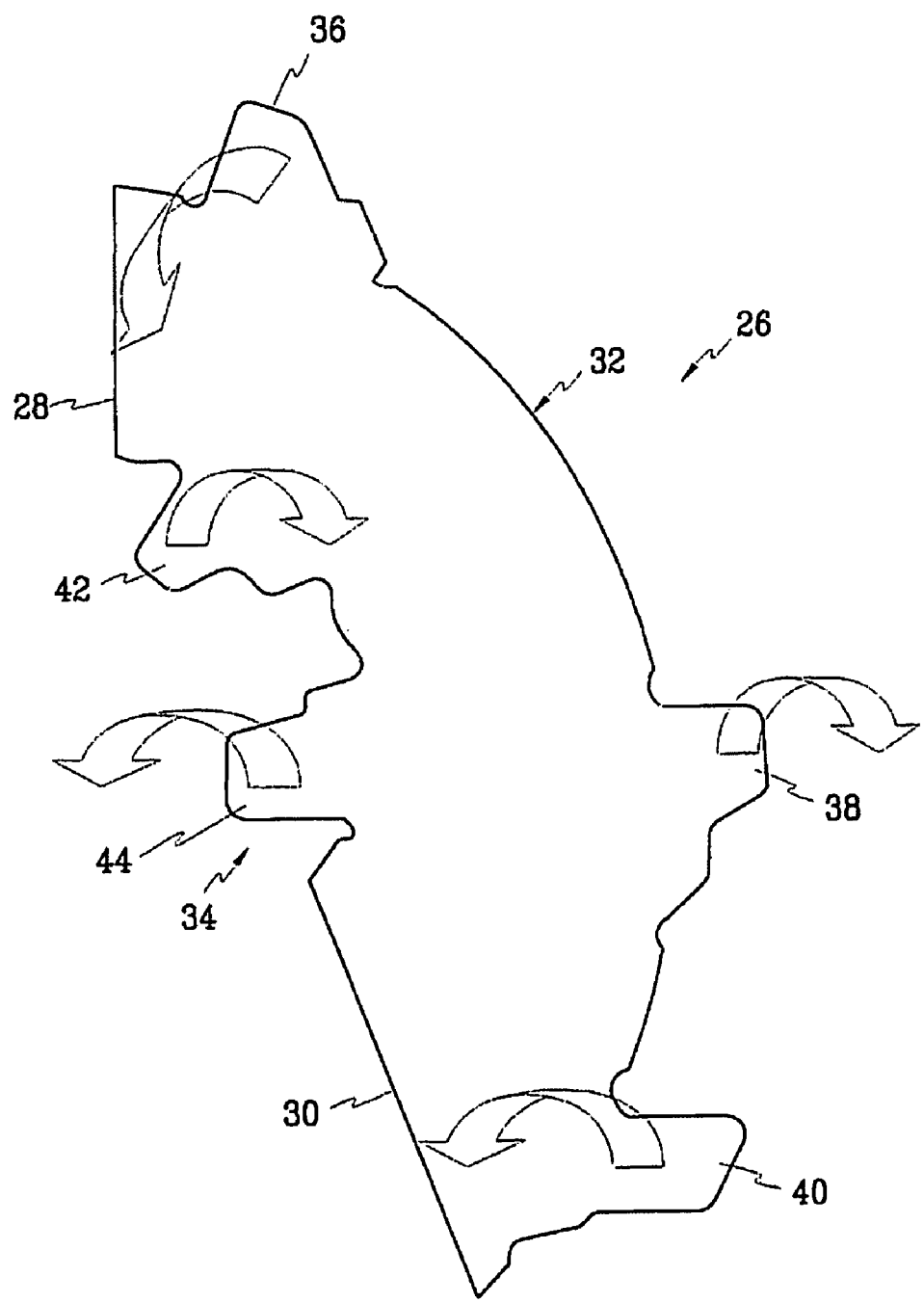
FIG. 2a is a view of blades of an impeller and/or a turbine according to an embodiment of the present invention.
Figure 2B:
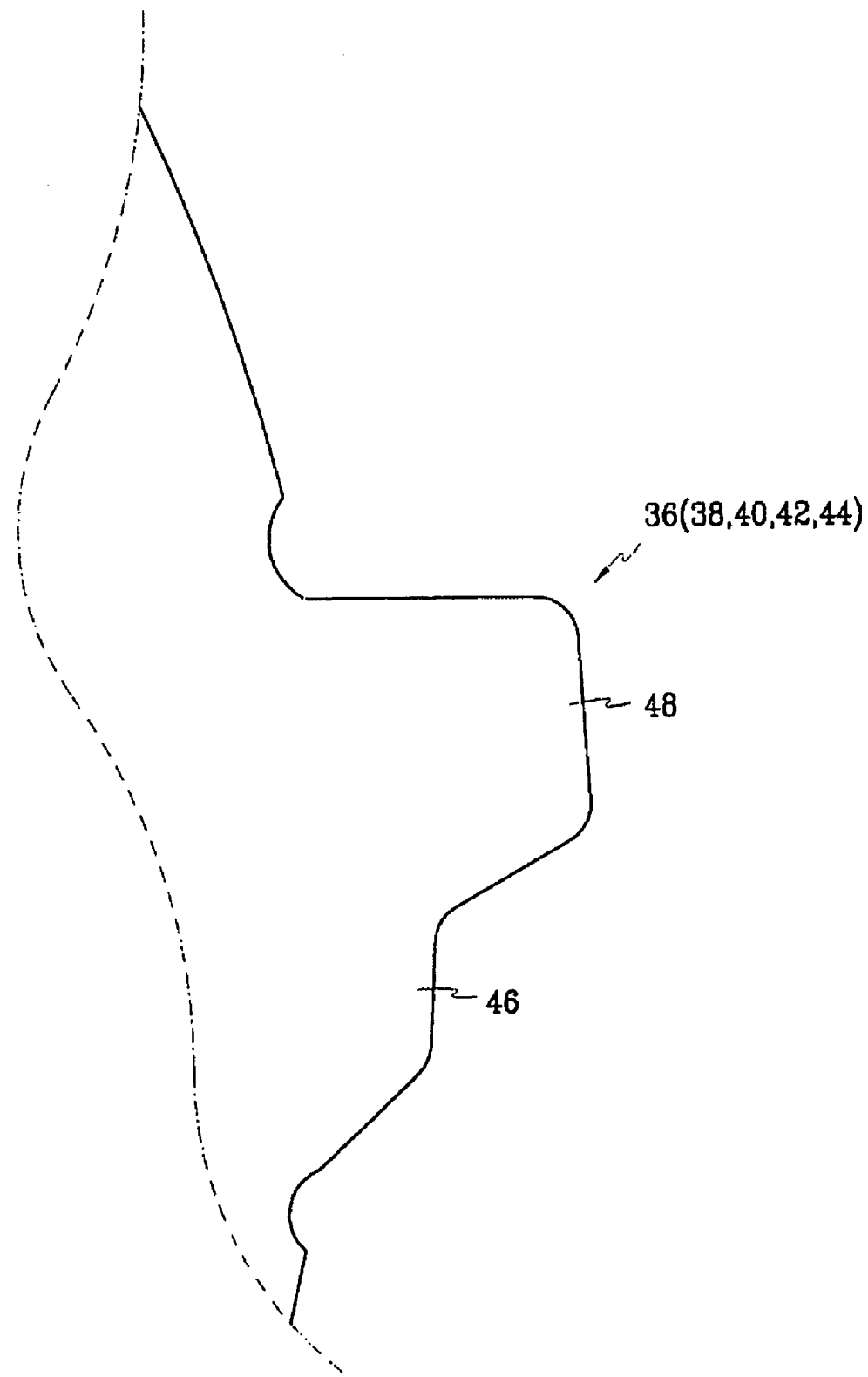

FIG. 1 is a half-sectional view of a torque converter according to an embodiment of the present invention, in which a left end of torque converter is connected to an engine and the torque converter has upper and lower halves that are identical to each other with reference to line B-B.

The inventive torque converter includes a front cover 4 integrally formed with a boss 2 to which a crank shaft, denoted C, of an engine side, denoted E, is connected, an impeller 6 connected to the front cover to rotate together, a turbine disposed facing the impeller 6, and a stator 10 disposed between the turbine 8 and the impeller 6 to cover the flow of oil directed from the turbine 8.

The impeller, turbine and stator 6, 8 and 10 define a torque fluid actuating portion 12 having a central axis identical to that of the front cover 4.

A lockup clutch device 14 is disposed between the front cover 4 and the turbine 8 to directly connect the engine to the transmission.

The lockup clutch device 14 is formed in a disk-shape. A central portion of the lockup clutch device 14 is splined to an outer circumference of the turbine hub 16 to be movable in a direction of an axis. The lockup clutch device 14 is disposed spacing away from the front cover 4 by a predetermined distance.

The lockup clutch device 14 includes a hydraulically-operated piston mechanism 18 and a damper mechanism reducing or absorbing torsional vibration generated during the rotation.

In the above-described torque converter, the each of the impeller and turbine 6 and 8 of the torque converter is comprised of a shell 22 defining an outer appearance, a core 24 located in the shell, and a plurality of blades 26 disposed between the shell and the core to induce the flow of the oil.

Since the blades 26 applied to the impeller and turbine 6 and 8 are identical to each other, only the blades 26 of the impeller 8 will be described in this embodiment.

Each of the blades includes two straight line sections 28 and 30, an outer section contacting an inner surface of the shell 22, and an inner section contacting the core 24.

The outer section 32 is provided with outer projections 36, 38 and 40 coupled to the shell 22. The inner section 34 is provided with inner projections 42, 44 coupled to the core 24.

The inner and outer projections 36, 38 and 40 and 42 and 44 are designed each having a size enough to penetrate slits (see FIG. 1) formed on the shell and core 22 and 24. Each of the inner and outer projections has a base 46 having a size identical to the slit and an extending section 48 extending from the base 46 and penetrating the slit.

Each extending section 48 of each projection is bent to closely contact the surface of the shell (or core), thereby maintaining the fixed state. That is, fixed state can be maintained by only bending the extending section 48. Particularly, in order to reduce the movement, the extending section is bent in an opposite direction to the adjacent extending section.

By doing this, the movement of the blades can be reduced.

In order to more securely fix the inner projections 42 and 44 of the blades 26 in the slits of the core 24, the slits of the core 24 are caulked after the projections are inserted therethrough.

Figure 3:
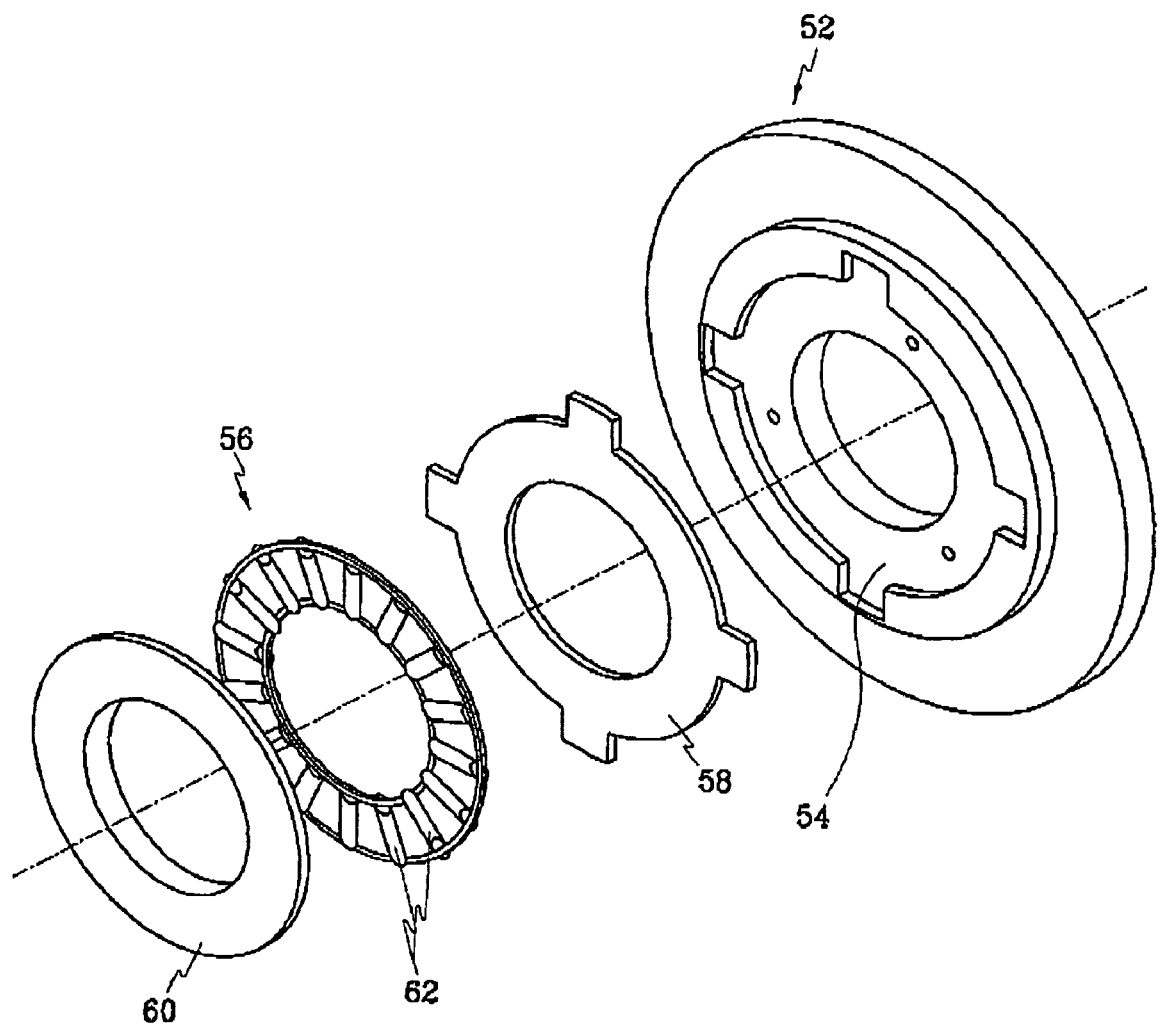
FIG. 3 is a perspective view of a retainer according to an embodiment of the present invention.

FIG. 3 shows a retainer wear preventing unit according to an embodiment of the present invention.

As shown in FIG. 1, the retainer wear preventing unit is provided on a retainer 52 disposed between the turbine hub 16 and the one-way clutch 50 to restrict the movement of the one-way clutch in a direction of a shaft axis.

The retainer wear preventing unit of the present invention includes a seating groove 54 formed on the retainer 52 and a needle bearing 56 seated on the seating groove 54.

That is, a race 58 of the needle bearing 56 is located on the seating groove 54 and needle members 62 are located between the race 58 and the other race 60.

By the above-described structure, since the race 58 of the bearing is not rotated relative to the retainer 52 even when the turbine rotates, the wear of the retainer can be prevented.

Figure 4:
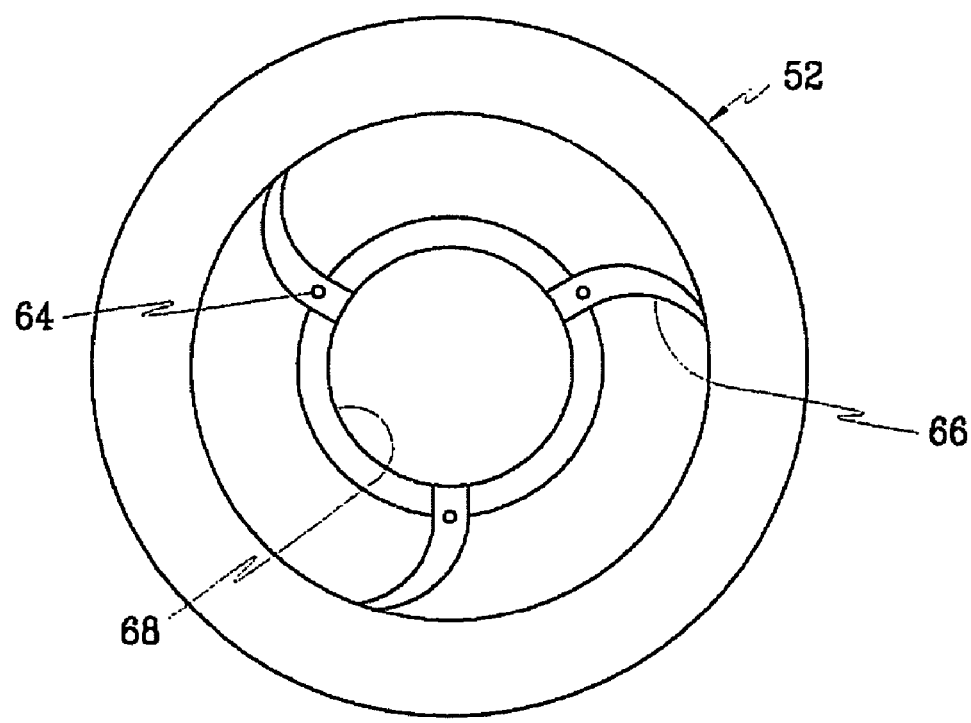
FIG. 4 is a front view of a retainer according to another embodiment of the present invention.

FIG. 4 shows a retainer according to another embodiment of the present invention.

A retainer 52 of this embodiment is provided with a hole 64 to supply oil used as lubricant to a one-way clutch 50 through the hole 64. In order to more effectively supply the oil to the hole 64, an oil supplying groove 66 is formed on the retainer.

The oil supply groove 6 is formed extending from a setting hole 68 formed through a center of the retainer 52 in a radial direction.

In order to enhance the fluidity of the oil, the oil supplying groove 66 is formed in a circular arc shape. That is, a width of the oil supplying groove 66 is gradually reduced as it goes from an inlet of the groove 66 toward an outer side.

Accordingly, the oil to be supplied to the one-way clutch for the lubrication moves along the oil supplying groove 66, in the course of which the oil is introduced toward the one-way clutch through the hole 64, thereby supplying the oil enough to effectively operate the one-way clutch.

Since the enough oil operating the one-way clutch is supplied, the frictional heat generated by the frictional rotation can be discharged.

According to the present invention, by modifying the coupling structure of the blades to the turbine and impeller, the assembling property and the structural rigidity can be enhanced. Furthermore, since the retainer is provided with the seating groove for receiving the race of the needle bearing, the movement of the one-way clutch in the direction of the shaft axis can be prevented. In addition, by modifying the oil flow passage for directing the oil to the one-way clutch, the endurance of the torque converter can be improved.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A torque converter for a vehicle, comprising:
    a front cover integrally formed with a boss to which a crank shaft of an engine side is connected,
    an impeller connected to the front cover to rotate together with the front cover,
    a turbine disposed facing the impeller,
    a stator disposed between the impeller and the turbine to convert flow of oil directed from the turbine;
    a lockup clutch mechanism for directly connecting the engine to the turbine,
    wherein a blade of the impeller and/or the turbine is provided with inner and outer projections coupled to a shell and a core of the impeller and/or the turbine; and
    each of the inner and outer projections includes a base located on a slit formed on the shell/core and an extending section extending from the base, the extending section being bent after penetrating the slit;
    wherein the stator is coupled on an outer circumference of a one-way clutch, further comprising a retainer coupled to the one-way clutch to prevent axial movement of the one-way clutch, the retainer being provided with a groove on which a race of a needle bearing supporting axial load of the impeller and the turbine is located, the retainer being also provided with a hole through which oil is supplied to the one-way clutch, the hole being formed on the oil supplying groove; and
    wherein the oil supplying groove is provided in the retainer, the oil supplying groove being formed in an arc shape, and the width of the oil supplying groove is gradually reduced as it goes from a center portion to an outer portion.

2. The torque converter of claim 1, wherein the slit through which the projection is inserted is caulked to prevent the projection from moving.

3. The torque converter of claim 1, wherein the extending sections are bent in an opposite direction to each other.

* * * * *